(12) United States Patent
Lee

(10) Patent No.: US 9,840,891 B2
(45) Date of Patent: Dec. 12, 2017

(54) ELECTROMECHANICAL SHIFTING TOOL

(71) Applicant: Halliburton Energy Services, Inc., Houston, TX (US)

(72) Inventor: Shao Hwa Lee, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 13 days.

(21) Appl. No.: 14/900,522

(22) PCT Filed: Mar. 13, 2015

(86) PCT No.: PCT/US2015/020525
§ 371 (c)(1),
(2) Date: Dec. 21, 2015

(87) PCT Pub. No.: WO2016/148679
PCT Pub. Date: Sep. 22, 2016

(65) Prior Publication Data
US 2017/0107792 A1    Apr. 20, 2017

(51) Int. Cl.
*E21B 34/14*  (2006.01)
*E21B 34/06*  (2006.01)
(Continued)

(52) U.S. Cl.
CPC .............. *E21B 34/14* (2013.01); *E21B 23/00* (2013.01); *E21B 34/066* (2013.01);
(Continued)

(58) Field of Classification Search
CPC .................................. E21B 23/00; E21B 34/14
See application file for complete search history.

(56) References Cited

U.S. PATENT DOCUMENTS 5,156,210 A   10/1992 Roth
5,305,833 A    4/1994 Collins
(Continued)

FOREIGN PATENT DOCUMENTS

CA       2758583 A1    10/2010

OTHER PUBLICATIONS

International Search Report and Written Opinion for PCT/US2015/020525 dated Nov. 18, 2015.

*Primary Examiner* — Giovanna C. Wright
*Assistant Examiner* — Tara E Schimpf
(74) *Attorney, Agent, or Firm* — McDermott Will & Emery LLP

(57) ABSTRACT

Disclosed are shifting tools for opening and closing shifting sleeves. A disclosed completion system includes a completion string having a shifting sleeve movably arranged therein, a service tool configured to be arranged at least partially within the completion string and including a shifting tool having one or more shifting keys configured to mate with the shifting profile. When the shifting keys locate and mate with the shifting profile, an axial load applied on the service tool axially moves the shifting sleeve. If the shifting key is misaligned with a complementary shape of the shifting sleeve, a lower detent housing retracts toward an upper detent housing against a force of a detent spring to allow the shifting keys to retract while maintaining a radially outward force. If an axial load is removed, the housings are automatically retracted by a return spring, causing the shifting keys to disengage.

15 Claims, 9 Drawing Sheets

(51) Int. Cl.
    *F16H 25/22*     (2006.01)
    *F16H 25/24*     (2006.01)
    *F16H 25/20*     (2006.01)
    *E21B 23/00*     (2006.01)
    *E21B 34/00*     (2006.01)

(52) U.S. Cl.
    CPC ..... *F16H 25/2025* (2013.01); *F16H 25/2204* (2013.01); *F16H 25/2454* (2013.01); *E21B 2034/007* (2013.01); *F16H 2025/2062* (2013.01)

(56) References Cited

U.S. PATENT DOCUMENTS

| | | | |
|---|---|---|---|
| 5,309,988 | A | 5/1994 | Shy et al. |
| 5,549,161 | A | 8/1996 | Gomez et al. |
| 5,678,633 | A * | 10/1997 | Constantine, Jr. ...... E21B 34/14 166/319 |
| 5,765,640 | A * | 6/1998 | Milne ................. E21B 17/1021 166/206 |
| 6,631,768 | B2 | 10/2003 | Patel et al. |
| 8,191,623 | B2 | 6/2012 | Lynde et al. |
| 2010/0258293 | A1 * | 10/2010 | Lynde .................... E21B 23/00 166/66 |
| 2010/0282475 | A1 | 11/2010 | Darnell et al. |
| 2012/0111579 | A1 | 5/2012 | Radford et al. |
| 2014/0338976 | A1 | 11/2014 | Xu et al. |

* cited by examiner

ELECTROMECHANICAL SHIFTING TOOL

This application is the national stage application of PCT/US2015/020525 by Shao Hwa Lee, filed on Mar. 13, 2015, entitled Electromechanical Shifting Tool.

BACKGROUND

Various types of well tools commonly used in oil and/or gas well production strings include sliding or shifting members that are required to be selectively actuated. For example, sliding sleeve valves generally include a sleeve, which is selectively shifted to open or close ports to provide communication from or shut off communication between the bore of a production string and the well annulus.

In some applications, particulate materials such as sand and other wellbore debris are produced to the surface during the extraction of hydrocarbons from a well that traverses unconsolidated or loosely consolidated subterranean formations. To prevent the production of such particulate material to the surface, unconsolidated or loosely consolidated production intervals in the well are often gravel packed. In a typical gravel pack operation, a completion string including a packer, a circulation valve, a fluid loss control device and one or more sand control screens, is lowered into the wellbore to a position proximate the desired production interval. A service tool is then positioned within the completion string and a fluid slurry that includes a liquid carrier and a particulate material (i.e., gravel) is then pumped through the circulation valve and into the well annulus formed between the sand control screens and the perforated well casing or open hole production zone. The liquid carrier either flows into the adjacent formation or returns to the surface by flowing through the sand control screens, or both. In either case, the gravel is deposited around the sand control screens to form a gravel pack, which is highly permeable to the flow of hydrocarbon fluids but simultaneously blocks the flow of particulate materials often suspended in the hydrocarbon fluids. As such, gravel packs can successfully prevent the problems associated with the production of particulate materials from the formation.

During the gravel packing operation, the service tool is often moved between various positions with respect to the completion string. For instance, the service tool typically has one or more shifting tools that can be used to move sliding sleeves associated with the completion string between open and closed configurations. Opening a circulating sleeve arranged in the circulation valve, for example, may expose one or more corresponding circulation ports that place the interior of the service tool in fluid communication with an annulus defined between the completion string and an adjacent formation. Upon removing the service tool from the completion string, it is often required to move various sleeves to their corresponding closed positions.

Some shifting tools traditionally operate based on hydraulic systems that utilize a "normally open" solenoid as a failsafe measure. Hydraulic systems can be expensive to build and maintain. Moreover, during use, heat and high pressure conditions in hydraulic systems can present safety hazards.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates to the treatment of subterranean production intervals and, more particularly, to shifting tools and shifting sleeves that can be opened and closed by the shifting tools.

The shifting tools disclosed herein allow an operator to controllably open and close shifting sleeves during a run-in into a wellbore. The shifting keys can be compliant to properly engage a shifting profile of the shifting sleeve. A detent spring allows upper and lower detent housings to move relative to each other and be biased away from each other to allow a limited range of radial movement by the shifting keys, as they attempt to align with the profile of the shifting sleeve. The shifting tool can automatically retract the keys to allow the shifting tool to be removed during power shutdown. Advantageously, such automatic release can be achieved without requiring power to drive the motor backwards, thereby removing the need for a backup battery that would otherwise reside onboard the shifting tool. Furthermore, a return spring biases at least one of the upper detent housing and the lower detent housing to a retracted position that is automatically achieved when the motor ceases its operations.

Figure 1:
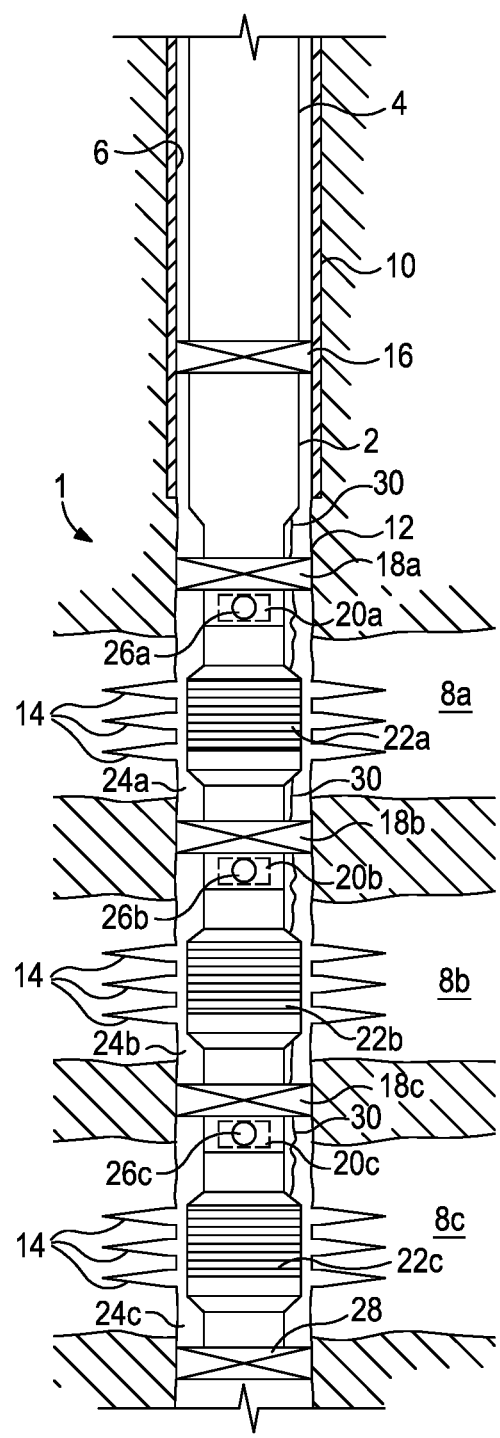
FIG. 1 illustrates an exemplary completion system that may employ the principles of the present disclosure, according to one or more embodiments.

Referring to FIG. 1, illustrated is an exemplary completion system 1 that may employ the principles of the present disclosure, according to one or more embodiments. As illustrated, the system 10 may include a completion string 2 that may be coupled to a work string 4 configured to extend longitudinally within a wellbore 6. The wellbore 6 may penetrate multiple subterranean formation zones 8a, 8b, and 8c, and the completion string 2 may be extended into the wellbore 6 until being arranged or otherwise disposed generally adjacent the formation zones 8a-c. The formation zones 8*a-c* may be portions of a common subterranean formation or hydrocarbon-bearing reservoir. Alternatively, one or more of the formation zones 8*a-c* may be portion(s) of separate subterranean formations or hydrocarbon-bearing reservoirs. The term "zone" as used herein, however, is not limited to one type of rock formation or type, but may include several types, without departing from the scope of the disclosure.

The completion string 2 may be deployed within the wellbore 6 and used to hydraulically fracture and gravel pack the various formation zones 8*a-c*, and subsequently regulate hydrocarbon production from each production interval or formation zone 8*a-c*. Although only three formation zones 8*a-c* are depicted in FIG. 1, it will be appreciated that any number of formation zones 8*a-c* may be treated or otherwise serviced using the completion system 1. For instance, while the completion system 1 is depicted as being arranged to treat multiple zones 8*a-c*, it is also contemplated to position a variation of the completion system 1 at a single zone, without departing from the scope of the disclosure.

As depicted in FIG. 1, portions of the wellbore 6 may be lined with casing 10 and cemented therein, as known in the art. The remaining portions of the wellbore 6, including the portions encompassing the formation zones 8*a-c*, may form part of an open hole section 12 of the wellbore 6 and the completion string 2 may be configured to be generally arranged therein during operation. In other embodiments, however, the casing 10 may extend further into the wellbore 6 and otherwise encompass one or more of the formation zones 8*a-c*, without departing from the scope of the disclosure.

Several perforations 14 may be initiated at or in each formation zone 8*a-c* and configured to provide fluid communication between each respective formation zone 8*a-c* and the annulus 24*a-c* (shown as a first annulus 24*a*, a second annulus 24*b*, and a third annulus 24*c*) formed between the completion string 2 and walls of the open hole section 12. Particularly, a first annulus 24*a* may be generally defined between the first formation zone 8*a* and the completion string 2. Second and third annuli 24*b* and 24*c* may similarly be defined between the second and third formation zones 8*b* and 8*c*, respectively, and the completion string 2. In embodiments where the casing 10 extends across the formation zones 8*a-c*, the casing 10 may also be perforated to allow fluid flow into each annulus 24*a-c*.

The completion string 2 may include a top packer 16 including slips (not shown) configured to support the completion string 2 within the casing 10 when properly deployed. In some embodiments, the top packer 16 may be a VERSA-TRIEVE® hangar packer commercially available from Halliburton Energy Services of Houston, Tex., USA. Disposed below the top packer 16 may be one or more isolation packers 18 (three shown as packers 18*a*, 18*b*, and 18*c*) and a sump packer 28, which cooperatively define individual production intervals corresponding to the various formation zones 8*a-c* between adjacent packers 18*a-c* and 28.

One or more shifting sleeves 20 (three shown in phantom as shifting sleeves 20*a*, 20*b*, and 20*c*) and one or more sand screens 22 (three shown as sand screens 22*a*, 22*b*, and 22*c*) may be arranged in each production interval. Each shifting sleeve 20*a-c* may be movably arranged within the completion string 2 and, as will be discussed below, may be configured to axially translate between open and closed positions. First, second, and third circulation ports 26*a*, 26*b*, and 26*c* may be defined in the completion string 2 at the first, second, and third shifting sleeves 20*a-c*, respectively. When the shifting sleeves 20*a-c* are moved into their respective open positions, the circulation ports 26*a-c* are exposed and may thereby provide fluid communication between the interior of the completion string 2 and the corresponding annuli 24*a-c*.

A service tool (not visible in FIG. 1), also known as a gravel pack service tool or a completion service tool, may be extended from a surface location and positioned within the completion string 2 to regulate the gravel packing and hydraulic fracturing processes of each zone 8*a-c*. As will be discussed below, the service tool may include one or more shifting tools (not shown) used to open and close the shifting sleeves 20*a-c*. The service tool may also include a valve (not shown) that helps facilitate the introduction of a gravel pack within each annulus 24*a-c* and also facilitate the hydraulic fracturing process through the corresponding circulation ports 26*a-c*.

In some embodiments, the completion system 1 may further include one or more control lines 30 (one shown) extending externally along the completion string 2 and within each annulus 24*a-c*. The isolation packers 18*a-c* may include or otherwise be configured for control line bypass, which allows the control line 30 to pass therethrough external to the completion string 2. The control line 30 may be representative of or otherwise include one or more electrical lines, one or more fiber optic lines, and/or one or more hydraulic lines used to actuate various downhole tools or otherwise report various fluid properties and well environment parameters within each annulus 24*a-c* during both the gravel packing and fracking operations.

Even though FIG. 1 depicts a vertical well, it will be appreciated by those skilled in the art that the principles of the present disclosure are equally well-suited for use in deviated wells, inclined wells, or horizontal wells. Additionally, even though FIG. 1 has been described with reference to a gravel packing operation, it should be noted that the principles of the present disclosure are equally well-suited for use in a variety of treatment operations where it is desirable to selectively move the shifting sleeves 20*a-c* between open and closed positions.

Figure 2A:
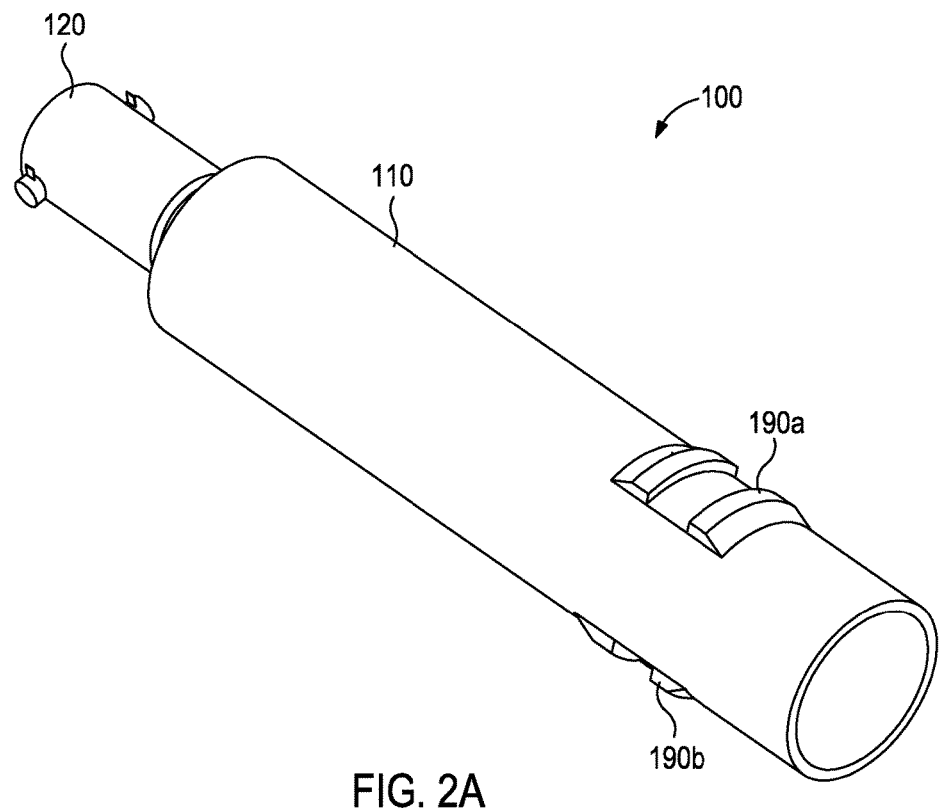
FIG. 2A illustrates a perspective view of an exemplary shifting tool, according to one or more embodiments.
Figure 2B:
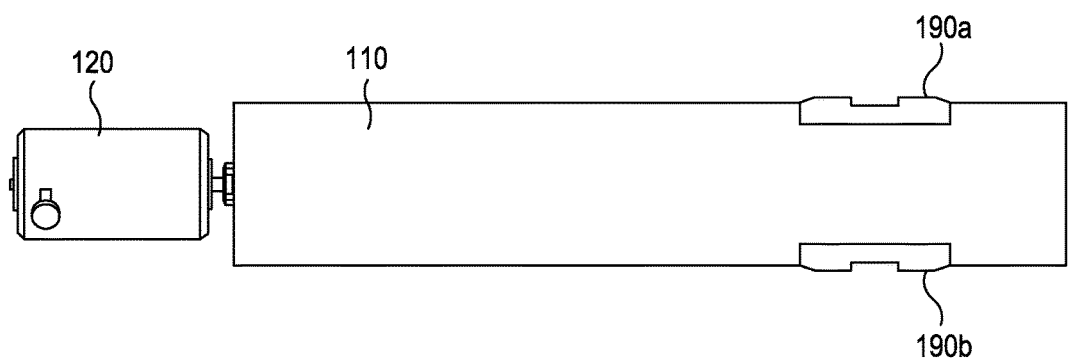
FIG. 2B illustrates a plan view of an exemplary shifting tool, according to one or more embodiments.

FIGS. 2A and 2B illustrate, respectively, a perspective view and a plan view of an exemplary shifting tool 100 with shifting keys 190*a* and 190*b* in a retracted position, according to one or more embodiments. According to one or more embodiments, as illustrated in FIGS. 2A and 2B, the shifting tool 100 may include a main housing 110 from which one or both of the shifting keys 190*a,b* can be radially advanced and/or retracted by operation of a motor 120. Any number of shifting keys may be provided in any orientation. For example, one shifting key 190 or more than one shifting key 190 can be provided. A plurality of shifting keys 190 can have the same axial alignment or different axial alignments. A plurality of shifting keys 190 can be circumferentially distributed about a central axis in a symmetrical or asymmetrical distribution.

Figure 2C:
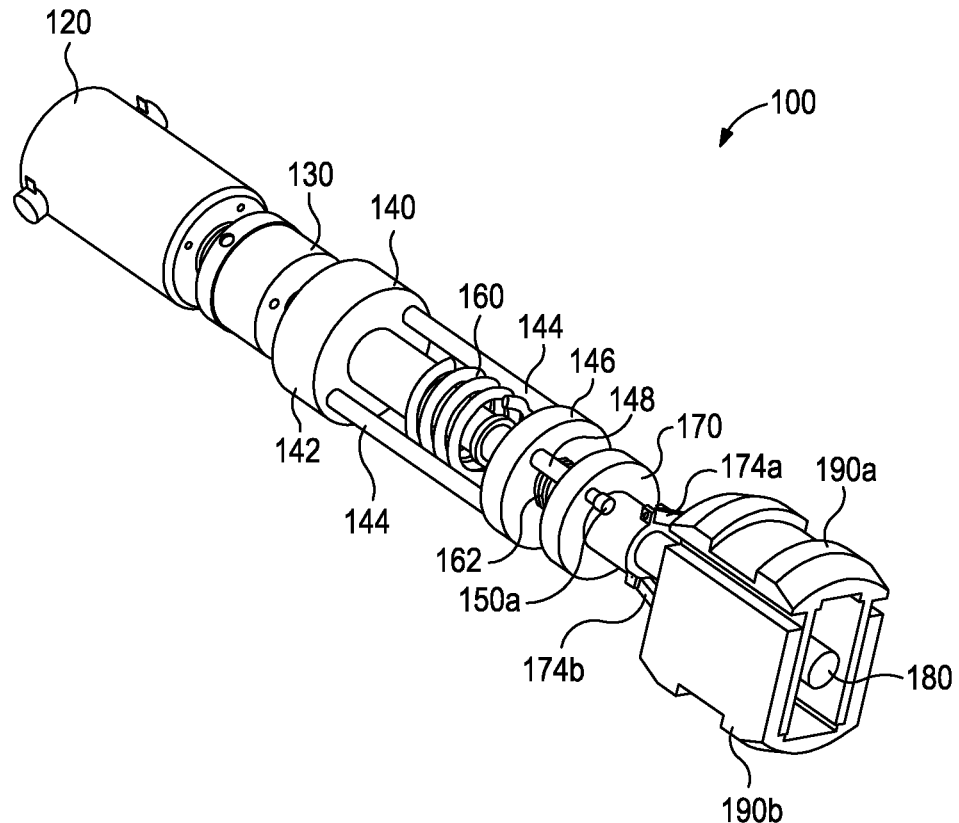
FIG. 2C illustrates a perspective view of an exemplary shifting tool, according to one or more embodiments.
Figure 2D:
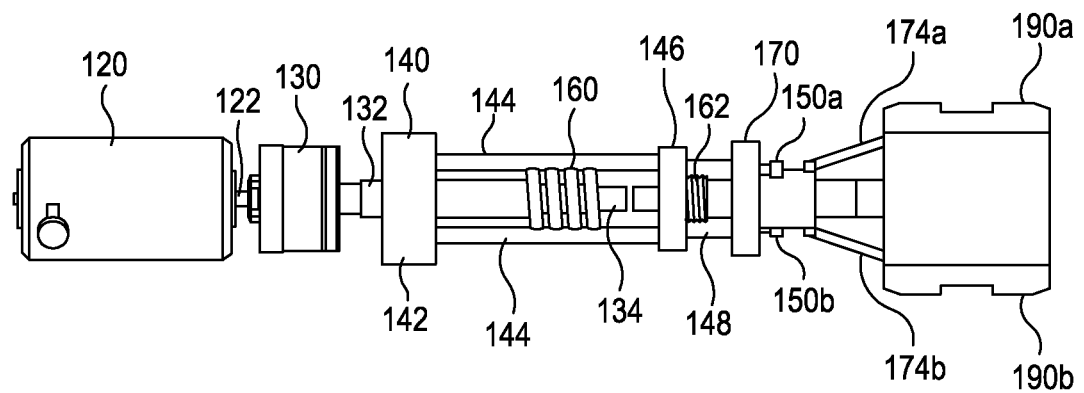
FIG. 2D illustrates a plan view of an exemplary shifting tool, according to one or more embodiments.

FIGS. 2C and 2D illustrate, respectively, exposed perspective and plan views of the shifting tool 100, according to one or more embodiments. According to one or more embodiments, as illustrated in FIGS. 2C and 2D, an upper detent housing 146 is also advanceable along the shifting rod 180. The upper detent housing 146 is connected to the lower detent housing 170 by at least one detent arm 148 that is fixed to the upper detent housing 146 and axially moveable through the lower detent housing 170 between an advanced position and a retracted position. A detent spring 162 is biased to urge the lower detent housing 170 away from the upper detent housing 146. As used herein, the detent spring 162 can be a compression spring or any another mechanism that provides a force in response to compression thereof. Under certain conditions, advancement of the upper detent housing 146 transmits a force to the lower detent housing 170 or a force to the detent spring 162, as discussed further herein.

According to one or more embodiments, as illustrated in FIGS. 2C and 2D, a nut 142 can be connected to the upper detent housing 146 by one or more extension arms 144. The nut 142, the extension arms 144, and the upper detent housing 146 can form an upper assembly 140 that moves in unison. The nut 142 can move along an upper rod 134 (FIG. 2D). The upper rod 134 can be fixed relative to the main housing 110, such that the upper assembly 140 can move relative to the main housing 110 by traveling along the upper rod 134.

Figure 3A:
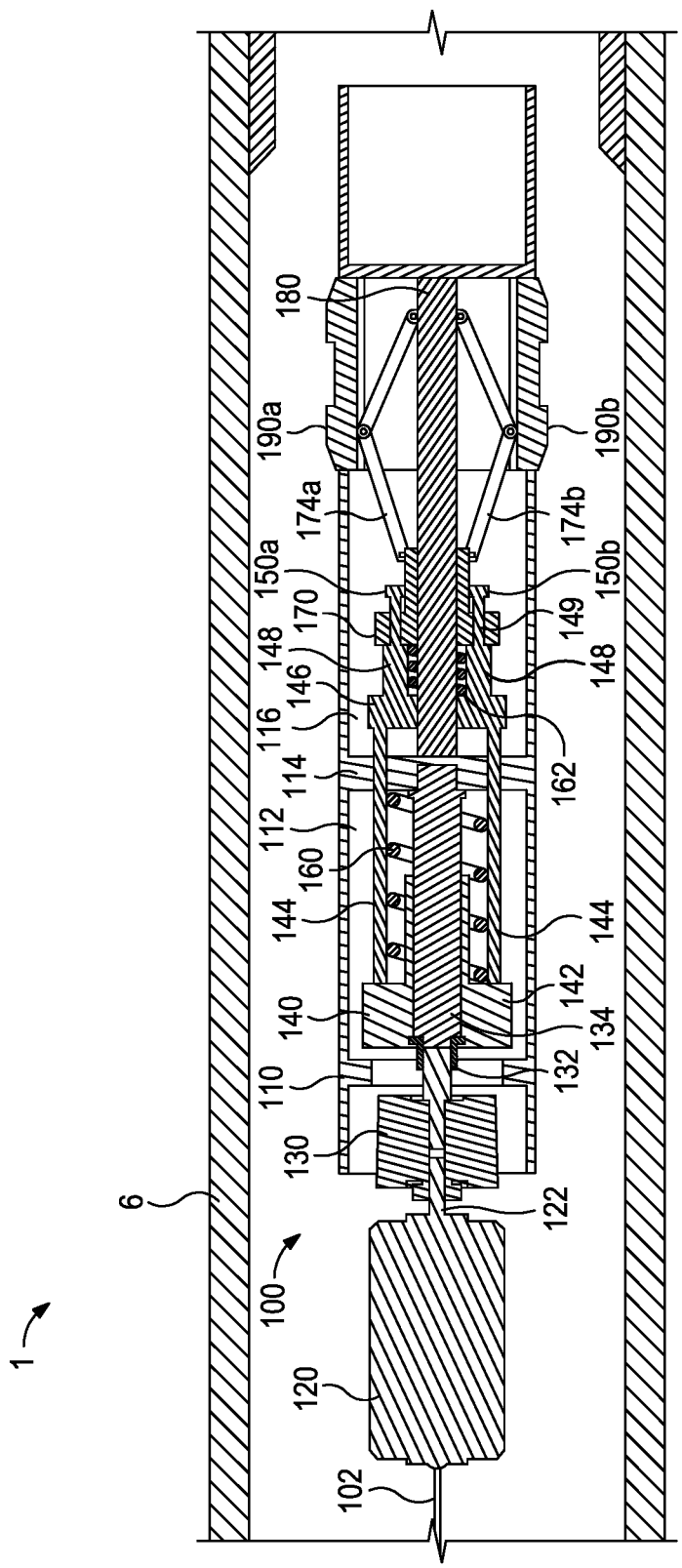
FIG. 3A illustrates a cross-sectional side view of an exemplary shifting tool in a retracted configuration, according to one or more embodiments.

FIG. 3A illustrates a cross-sectional side view of the exemplary shifting tool 100 in a retracted configuration, according to one or more embodiments. As illustrated in FIG. 3A, the main housing 110 can provide an upper chamber 112 and a lower chamber 116. The upper chamber 112 can be separated from the lower chamber 116 by a partition wall 114. The nut 142 can be disposed within the upper chamber 112, and the upper detent housing 146 can be disposed within the lower chamber 116. The extension arms 144 can extend through the partition wall 114 through one or more apertures defined therethrough.

Figure 3B:
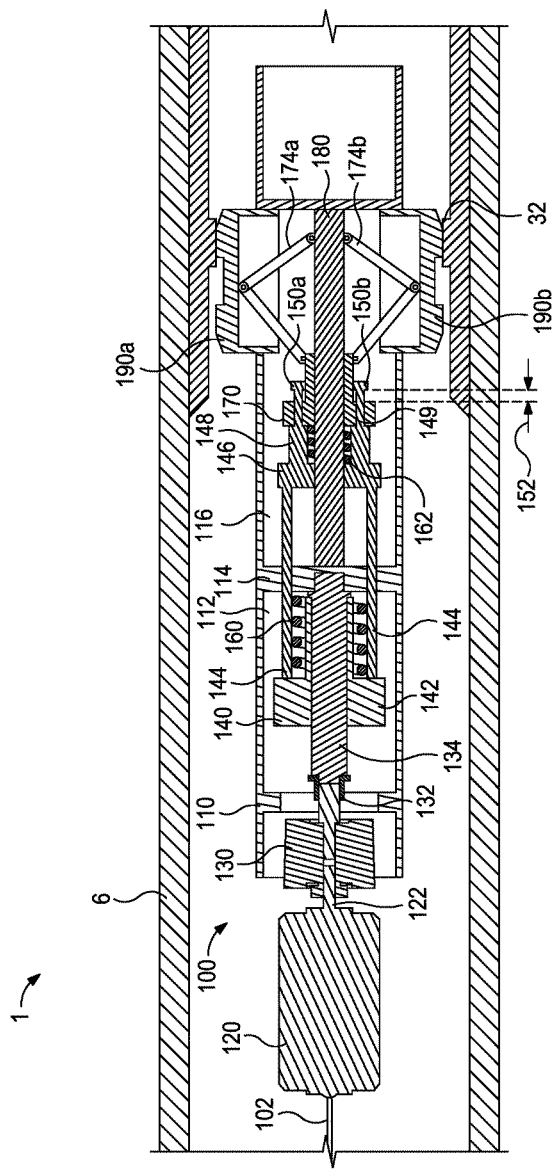
FIG. 3B illustrates a cross-sectional side view of an exemplary shifting tool in an actuated configuration partially contacting a shifting sleeve, according to one or more embodiments.

According to one or more embodiments, as illustrated in FIGS. 3A and 3B, the shifting 100 tool includes a lower detent housing 170 connected to shifting keys 190*a*,*b* via linkages 174*a*,*b*, respectively. The shifting rod 180 can be fixed relative to the main housing 110, such that the lower detent housing 170 can move relative to the main housing 110 by traveling along the shifting rod 180. As the lower detent housing 170 is advanced or retracted, an attached end of each of the linkages 174*a*,*b* is correspondingly advanced or retracted. An opposite end of each of the linkages 174*a*,*b* that is attached to the shifting rod 180 remains stationary relative to the shifting rod 180. As the ends of each of the linkages 174*a*,*b* move toward each other, at least a portion of each of the linkages 174*a*,*b* move radially outwardly. As the ends of each of the linkages 174*a*,*b* move away from each other, at least a portion of each of the linkages 174*a*,*b* move radially inwardly. Accordingly, advancement and retraction of the lower detent housing 170 along the shifting rod 180 may result in the shifting keys 190*a*,*b* extending radially outwardly and inwardly, respectively.

According to one or more embodiments, as illustrated in FIG. 3A, a return spring 160 is biased to urge the upper detent housing 146 along the shifting rod 180 in a direction that allows retraction of the shifting keys 190*a*,*b* toward the shifting rod 180. As used herein, the return spring 160 can be a compression spring or any another mechanism that provides a force in response to compression thereof. The return spring 160 can be biased to apply a force against a nut 142 that is connected to the upper detent housing 146. The return spring 160 can also apply a force against a portion of the main housing 110, such as the partition wall 114. Accordingly, the return spring 160 can urge the upper assembly 140 and components thereof relative to the main housing 110.

The motor 120 may be configured to advance and retract the upper assembly 140 (including the upper detent housing 146) along the shifting rod 180. During operation, the motor 120 can generate a force via an output shaft 122, wherein the force advances or retracts the nut 142, which thereby transmits the force to the upper detent housing 146. The motor 120 can generate a rotary force that is translated to linear motion of the upper assembly 140 via a ball screw device 132. As the motor 120 rotates, the ball screw device 132 causes a corresponding linear motion of the upper assembly 140. According to one or more embodiments, a torque-limiting clutch 130 can be provided between the motor 120 and the upper assembly 140 to controllably limit the forces applied to the upper assembly 140. The torque-limiting clutch 130 can be actively controlled during operation or preprogrammed to limit torque above a given threshold. Linear motion of upper and/or lower detent housings 146, 170 can cause a radial extension of linkages 174*a*,*b* and corresponding radial extension of the shifting keys 190*a*,*b*. Alternatively, a linear motor can be used to extend and retract the upper assembly 140.

According to one or more embodiments, the shifting keys 190 may be configured to automatically radially retract upon termination of power to the motor 120. More particularly, when the motor 120 and/or the torque-limiting clutch 130 are no longer powered, either by failure thereof or by deactivation, the return spring 160 may operate to urge the upper assembly 140 to move within the main housing 110. The lower detent housing 170 is likewise urged, causing the linkages 174*a*,*b* and the shifting keys 190*a*,*b* to retract radially inwardly. The shifting keys 190*a*,*b* can retract based upon an attachment to the linkages 174*a*,*b* or based upon a separate mechanism that biases the shifting keys 190*a*,*b* to a radially retracted position.

As illustrated in FIG. 3A, the shifting tool 100 can be advanced within the wellbore 6 to a given shifting sleeve 20. FIG. 3B illustrates a cross-sectional side view of the shifting tool 100 in an actuated configuration partially contacting the shifting sleeve 20. As discussed above, the motor 120 can cause axial advancement of the upper assembly 140, including the upper and lower detent housings 146, 170, and thereby actuate the linkages 174*a*,*b* to cause radial extension of the shifting keys 190*a*,*b*. As shown, the shifting keys 190*a*,*b* may extend into contact with the engagement elements 32 of the shifting sleeve 20 before the profile 192 of a shifting key 190 is properly aligned with a corresponding engagement element 32. For example, a recess and/or protrusion can be configured to engage a complementary profile of the engagement element 32 when properly axially aligned there with. When improperly aligned, the shifting key 190 is not permitted to radially extend to the same extent as when it is properly aligned. As such, the misaligned components force the shifting keys 190*a*,*b* into a partially radially retracted position. This position also forces the linkages 174*a*,*b* and the lower detent housing 170 to become or remain partially retracted.

According to one or more embodiments, the lower detent housing 170 can achieve and maintain a partially retracted position while the upper detent housing 146 is fully extended based on operation of the motor 120. As the motor 120 advances the upper assembly 140, the return spring 160 may be compressed. The upper assembly 140 can be extended to a position corresponding to a desired extension of the shifting keys 190*a*,*b*. Such a position can be achieved, for example, when the return spring 160 is fully compressed. Upon full extension of the upper assembly 140, the torque limiting clutch 130 can allow a degree of slip to prevent further force transmission and to prevent the motor 120 from stalling.

As shown in the enlarged view of FIG. 3B, the detent arms 148 extending from the upper detent housing 146 can provide a narrow section 149 that extends through an aperture 172 of the lower detent housing 170. The narrow section 149 can have a smaller cross-sectional diameter than axially adjacent portions of the detent arm 148 and/or a detent end portion 150. For example, the relatively larger cross-sectional dimensions of the detent arm 148 and the detent end portion 150 are too large to pass through the aperture 172 of the lower detent housing 170. Accordingly, the narrow section 149 slides within the aperture 172 to allow a degree of axial movement of the upper assembly 140, including the upper detent housing 146, relative to the lower detent housing 170. For any given position within the aperture 172, the narrow section 149 forms a gap 152 on one or both sides of the lower detent housing 170. In the configuration shown in FIG. 3B, the force applied by the motor 120 is transmitted to the upper detent housing 146. An opposing force is applied by contact between the shifting keys 190a,b and the engagement element 32 and transmitted to the lower detent housing 170. The opposing forces applied to the upper detent housing 146 and the lower detent housing 170 cause compression of the detent spring 162, which thereby stores energy as it is compressed.

Figure 3C:
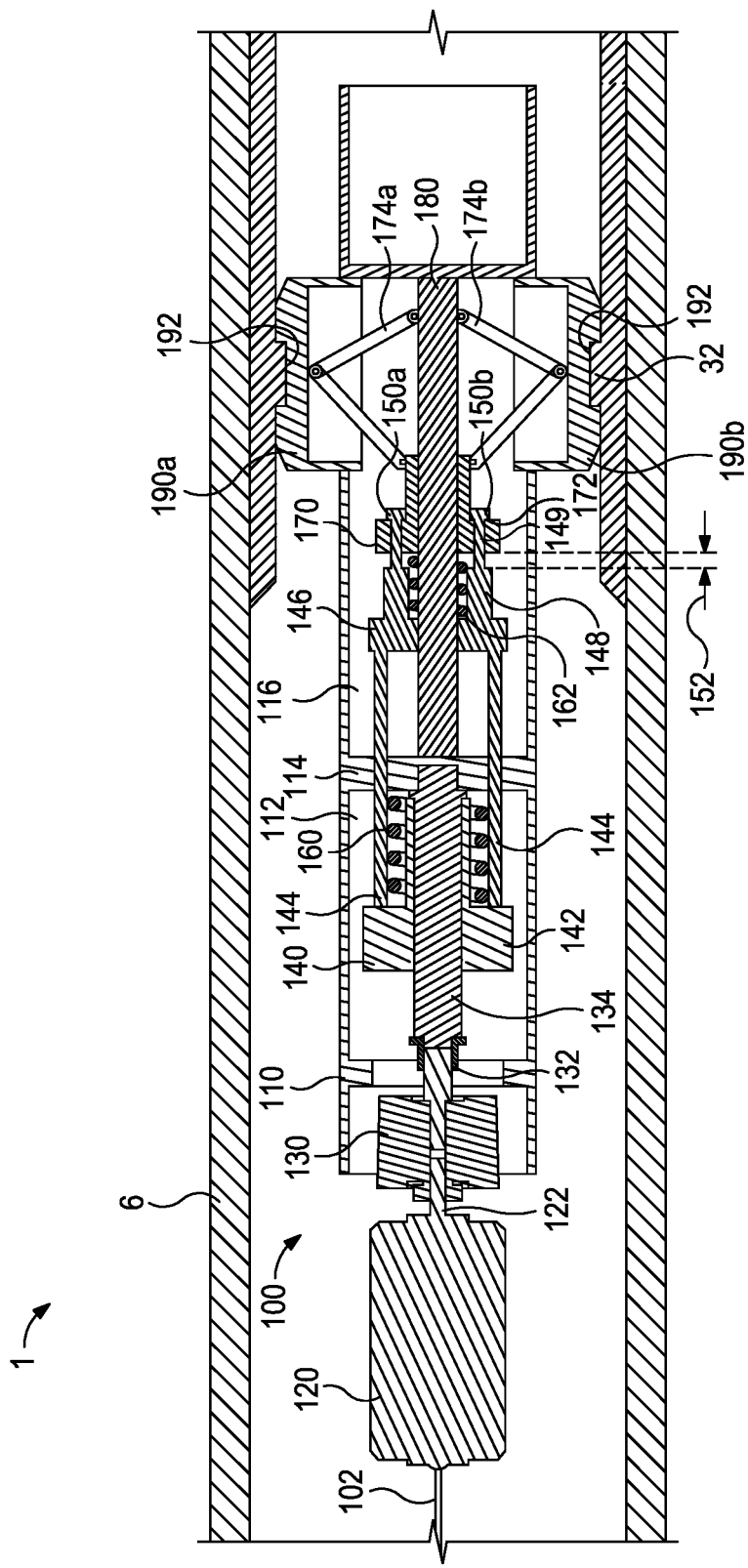
FIG. 3C illustrates a cross-sectional side view of an exemplary shifting tool in an actuated configuration engaged to a shifting sleeve, according to one or more embodiments.

FIG. 3C illustrates a cross-sectional side view of the shifting tool 100 in an actuated configuration engaged to the shifting sleeve 20, according to one or more embodiments. As shown in FIG. 3C, the shifting keys 190a,b can become properly aligned with the engagement elements 32 of the shifting sleeve 20 such that complementary profiles are matched. When properly aligned, each shifting key 190a,b is permitted to radially extend to a greater extent than while improperly aligned. The lower detent housing 170 can achieve and maintain a fully extended position. As the shifting keys 190a,b mate with the engagement elements 32, the detent spring 162 urges the lower detent housing 170 forward and the shifting keys 190a,b radially outwardly. The narrow section 149 slides within the aperture 172 to allow the energy stored in the detent spring 162 to be at least partially released. The gap 152 may form on an opposite side of the lower detent housing 170. Accordingly, the motor 120 can be operated to fully extend the upper assembly 140, including the upper detent housing 146, before the shifting keys 190a,b contact or fully engage the engagement element 32. In such a configuration, the shifting keys 190a,b automatically extend and engage without continuing adjustment of the upper assembly 140.

Upon engagement, the shifting keys 190a,b can maintain the position of the shifting tool 100 relative to the shifting sleeve 20. Accordingly, axial movement of the shifting tool 100 during engagement can cause corresponding axial movement of the shifting sleeve 20. As such, the shifting sleeve 20 can be moved within the wellbore 6. Axial movement of the shifting sleeve 20 can correspond to one or more of a variety of functions associated with a wellbore and operation thereof. For example, as discussed herein, actuation of the shifting sleeve 20 can be employed with operation of a sand screen for formation of a gravel pack in a gravel packing operation. By further example, shifting sleeves can be actuated to shut off flow from one or more reservoir zones or to regulate pressure between zones. Furthermore, actuation of a shifting sleeve as disclosed herein can be applied to any selective engagement and controlled motion of wellbore components and completion systems, as executed by a downhole tool.

Figure 3D:
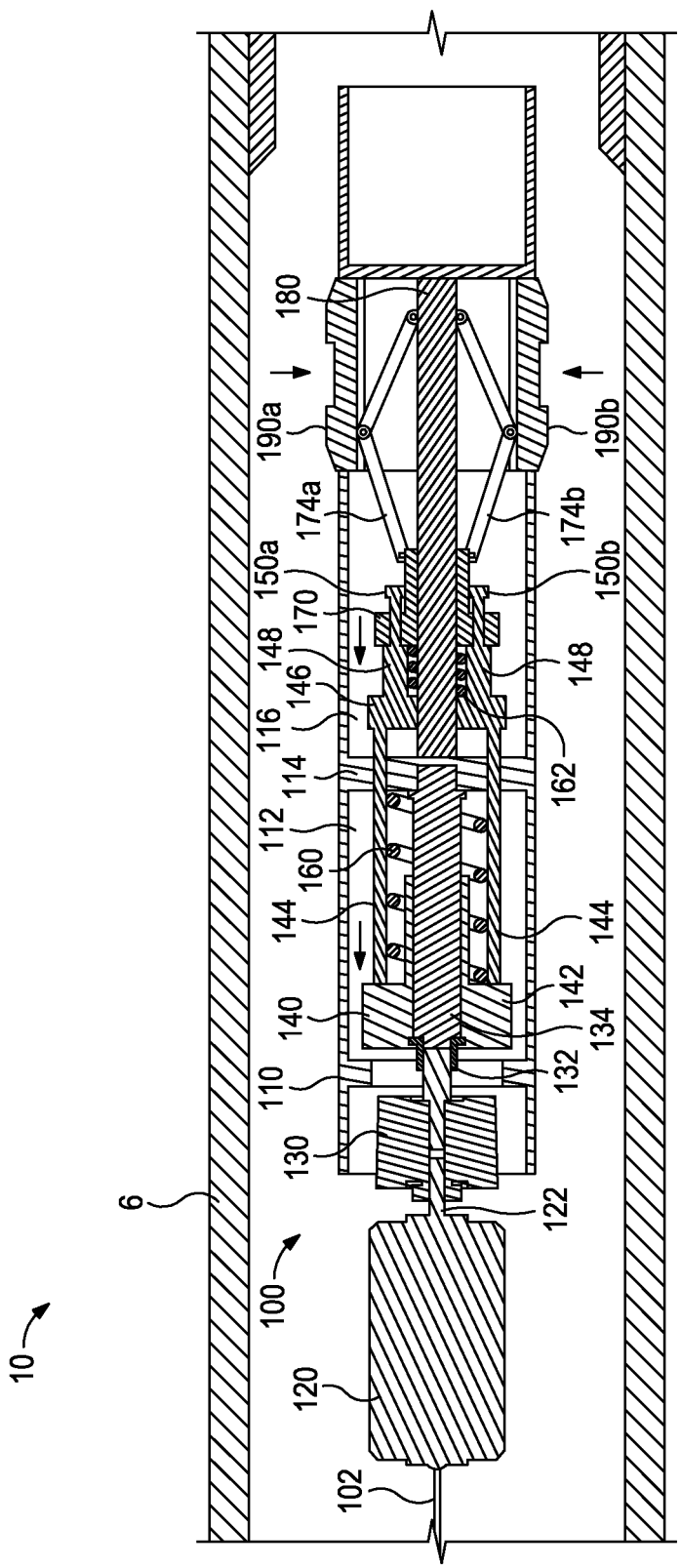
FIG. 3D illustrates a cross-sectional side view of an exemplary shifting tool in a retracted configuration, according to one or more embodiments.

FIG. 3D illustrates a cross-sectional side view of the shifting tool 100 in a retracted configuration, according to one or more embodiments. As shown in FIG. 3D, the upper assembly 140 can be retracted by operation or deactivation of the motor 120. For example, the motor 120 can be operated to retract the upper assembly 140. Alternatively or in combination, deactivation of the motor 120 can allow the return spring 160 to release stored energy and cause the knot 142 to move away from the wall partition 114. In the absence of sufficient counterforce from the motor 120, the return spring 160 causes the upper assembly 142 return to a retracted configuration. Accordingly, the lower detent housing 170 also retracts, allowing the linkages 174a,b and the shifting keys 190a,b to radially retract. Such actions can be achieved based on passive mechanisms, such as the return spring 160 and/or any other biasing mechanisms to cause retraction of the upper assembly 140, the lower detent housing 170, the linkages 174a,b, and/or the shifting keys 190a,b. As such, a loss of power to the motor 120 can automatically allow the shifting keys 190a,b to retract without active operation of the system.

Figure 4A:
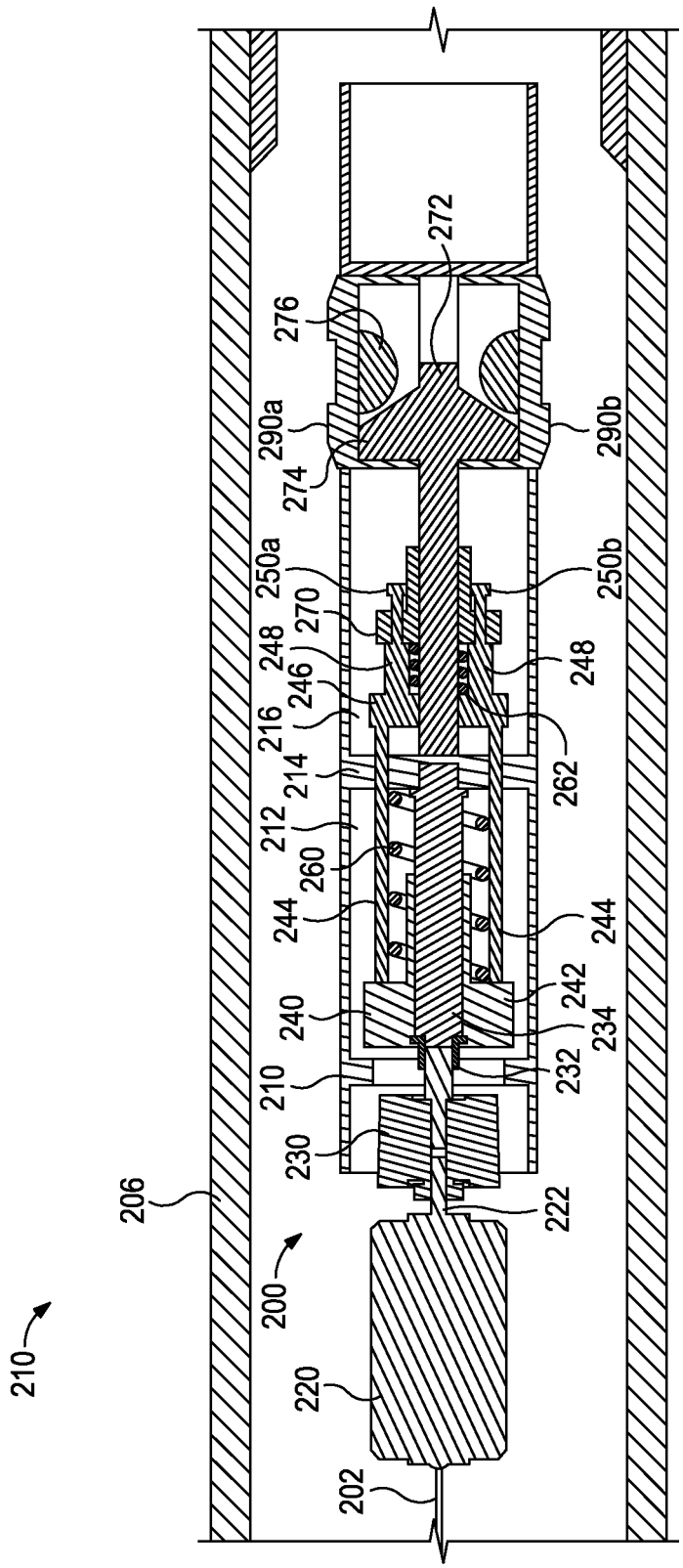
FIG. 4A illustrates a cross-sectional side view of an exemplary shifting tool in a retracted configuration, according to one or more embodiments.
Figure 4B:
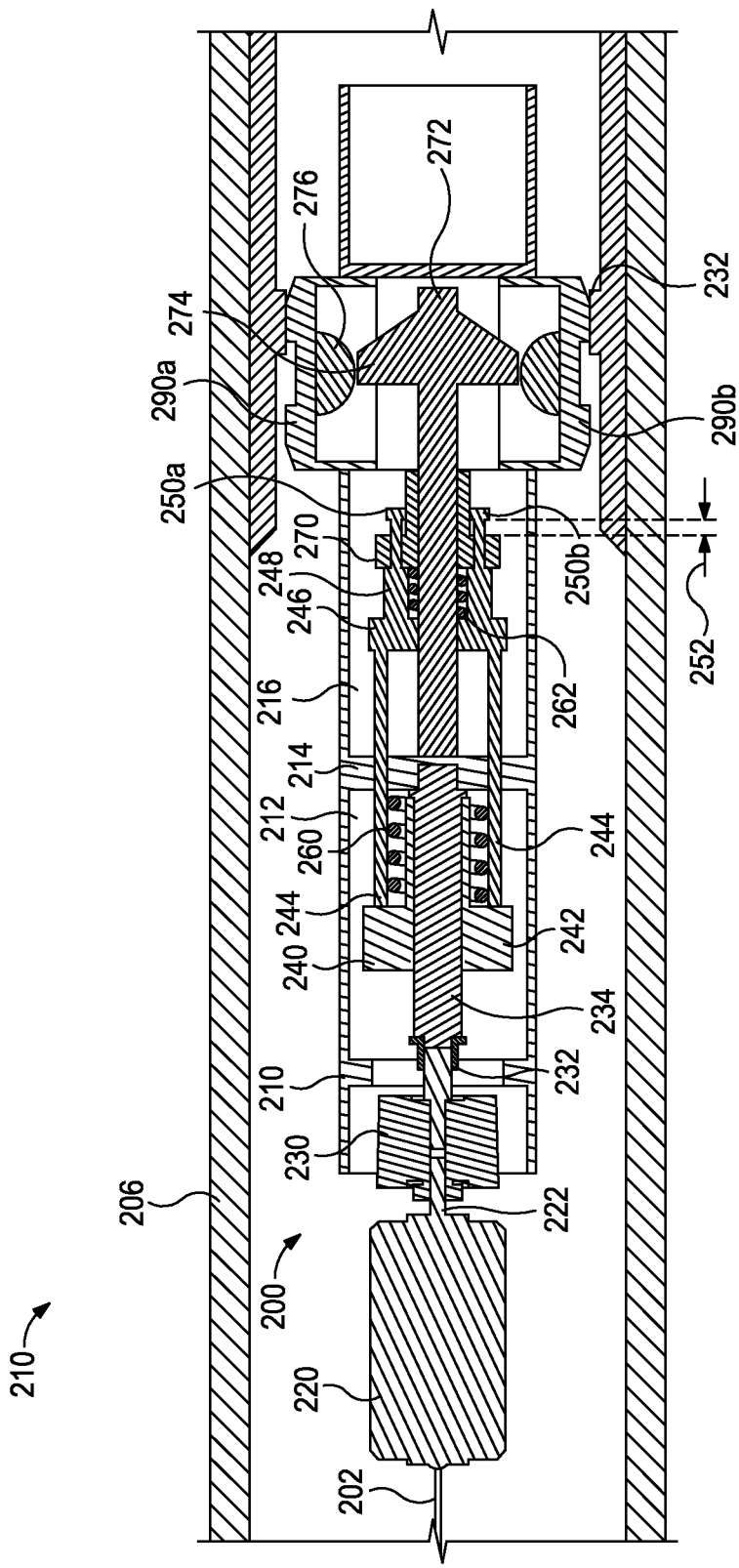
FIG. 4B illustrates a cross-sectional side view of an exemplary shifting tool in an actuated configuration, according to one or more embodiments.

Referring now to FIGS. 4A and 4B, illustrated is another exemplary shifting tool 200, according to one or more embodiments. The shifting tool 200 may be substantially similar to the shifting tool 100 described above with reference to FIGS. 2A-3D, and therefore may be best understood with reference to FIGS. 2A-3D, where like numerals and references refer to like components that will not be described again. As illustrated, the shifting tool 200 may include shifting keys 190a,b and a main housing 110 from which one or more shifting keys 190a,b can be radially advanced and/or retracted by operation of a motor 120. As with prior embodiments, any number of shifting keys may be provided in any orientation.

FIG. 4A illustrates a cross-sectional side view of the shifting tool 200 in a retracted configuration, according to one or more embodiments. As illustrated, the shifting 200 tool includes the lower detent housing 170 that may be connected to one or more wedge cams 274. Advancement of the lower detent housing 170 along the shifting rod 180 can axially advance the wedge cams 274. Each wedge cam 274 protrudes radially outwardly to provide a variable outer cross-sectional dimension along an axial length. For example, the wedge cams 274 can provide a surface that transitions from a minimum outer cross-sectional dimension of an end portion 272 to a maximum outer cross-sectional dimension of the one or more wedge cams 274. As shown in FIG. 4A, the leading surface of the wedge cams 274 can form a ramp. Alternatively or in combination, the leading surface of the wedge cams 274 can be tapered, conical, frustoconical, curved, linear, or combinations thereof.

According to one or more embodiments, each wedge cam 274 can interact with an engagement member 276 positioned on a corresponding one of the shifting keys 190a,b. Each engagement member 276 can extend radially inwardly from the associated shifting key 190a,b to provide a variable inner cross-sectional dimension along an axial length of the shifting key 190a,b. As shown in FIG. 4A, the engagement member 276 can form an arc. Alternatively or in combination, the engagement member 276 can be ramped, tapered, conical, frustoconical, curved, linear, or combinations thereof. At least a portion of the engagement members 276 can form a shape that is configured to interact with the wedge cams 274, such that axial motion of the wedge cams 274 facilitates radial extension of the shifting keys 190a,b. The engagement member 276 can be a rigid or flexible material.

When the end portion 272 is axially aligned with the engagement members 276, the shifting keys 190a,b are permitted to remain in a radially retracted position. FIG. 4B illustrates a cross-sectional side view of the shifting tool 200 in an actuated configuration, according to one or more embodiments. As shown, when the lower detent housing 170 is advanced such that the wedge cams 274 are axially aligned with the engagement members 276, the shifting keys 190*a,b* are radially extended.

As with prior embodiments, the upper detent housing 146 of the shifting tool 200 can be connected to the lower detent housing 170 by at least one detent arm 148 that is fixed to the upper detent housing 146 and axially moveable through the lower detent housing 170 between an advanced position and a retracted position. A detent spring 162 is biased to urge the lower detent housing 170 and the wedge cams 274 away from the upper detent housing 146. As with prior embodiments, when the shifting keys 190*a,b* become properly aligned with the engagement elements 32, the detent spring 162 urges the lower detent housing 170 and the wedge cams 274 axially forward and the shifting keys 190*a,b* radially outwardly. Alternatively or in combination, when the shifting keys 190*a,b* become properly aligned with the engagement elements 32, the engagement members 276 can urge the shifting keys 190*a,b* radially outwardly.

As with prior embodiments, the shifting keys 190 of the shifting tool 200 can be configured to automatically radially retract upon termination of power to the motor 120. When the motor 120 and/or the torque-limiting clutch 130 is no longer powered, either by failure thereof or by deactivation, the return spring 160 urges the upper assembly 140 to move within the main housing 110. The lower detent housing 170 is likewise urged, causing the wedge cams 274 to axially retract and the shifting keys 190*a,b* to retract radially inwardly.

Embodiments disclosed herein include:

A. A shifting tool that includes at least one shifting key, a lower detent housing operatively connected to the at least one shifting key such that advancement of the lower detent housing along a shifting rod advances the at least one shifting key radially away from the shifting rod, an upper detent housing slidingly coupled to the lower detent housing, a detent spring biased to urge the lower detent housing away from the upper detent housing, and a return spring biased to urge the upper detent housing along the shifting rod in a direction that allows retraction of the at least one shifting key toward the shifting rod.

B. A well system that includes a casing string extending from a surface location within a wellbore, a shifting sleeve within the casing string, and a shifting tool, comprising at least one shifting key configured to engage the shifting sleeve, a lower detent housing connected to the at least one shifting key such that advancement of the lower detent housing along a shifting rod advances the at least one shifting key radially away from the shifting rod, an upper detent housing slidingly coupled to the lower detent housing, a detent spring biased to urge the lower detent housing away from the upper detent housing, and a return spring biased to urge the upper detent housing along the shifting rod in a direction that allows retraction of the at least one shifting key toward the shifting rod.

C. A method that includes positioning a shifting key of a shifting tool in a vicinity of an engagement element of a shifting sleeve within a casing string, axially advancing an upper detent housing and a lower detent housing of the shifting tool with an advancing force and radially advancing at least a portion of the shifting key against the engagement element, axially moving the shifting sleeve within the casing string via an axial load from the shifting tool, and if the advancing force is removed, axially retracting the upper detent housing and the lower detent housing with a return spring and radially retracting the shifting key.

Each of embodiments A, B, and C may have one or more of the following additional elements in any combination: Element 1: further comprising a motor configured to advance and retract the upper detent housing along the shifting rod, a torque-limiting clutch, and a ball screw configured to translate rotary motion of the motor to axial motion of the upper detent housing. Element 2: wherein the lower detent housing is slidingly coupled to the upper detent housing by at least one detent arm that is fixed to the upper detent housing and axially moveable through the lower detent housing between an advanced position and a retracted position. Element 3: wherein the detent spring is biased to urge the detent arm to the retracted position. Element 4: wherein the at least one detent arm comprises an upper portion fixed to the upper detent housing, a narrow portion extending through the lower detent housing, and an end portion. Element 5: wherein a cross-sectional dimension of the narrow portion is smaller than a cross-sectional dimension of the upper portion and/or a cross-sectional dimension of the end portion. Element 6: wherein the lower detent housing transitions from the retracted position to the advanced position when a profile of the at least one shifting key is aligned with a complementary shape of an engagement element of a shifting sleeve. Element 7: wherein the lower detent housing is urged to the retracted position against a force of the detent spring when a profile of the at least one shifting key is misaligned with a complementary shape of an engagement element of a shifting sleeve. Element 8: wherein the at least one shifting key comprises a profile that is complementary with respect to an engagement element of a shifting sleeve.

Element 9: wherein the lower detent housing is slidingly coupled to the upper detent housing by at least one detent arm that is fixed to the upper detent housing and axially moveable through the lower detent housing between an advanced position and a retracted position. Element 10: wherein the detent spring is biased to urge the detent arm to the retracted position. Element 11: wherein the at least one detent arm comprises an upper portion fixed to the upper detent housing, a narrow portion extending through the lower detent housing, and an end portion. Element 12: wherein a cross-sectional dimension of the narrow portion is smaller than a cross-sectional dimension of the upper portion and/or a cross-sectional dimension of the end portion. Element 13: wherein the lower detent housing transitions from the retracted position to the advanced position when a profile of the at least one shifting key is aligned with a complementary shape of an engagement element of a shifting sleeve. Element 14: wherein the lower detent housing is urged to the retracted position against a force of the detent spring when a profile of the at least one shifting key is misaligned with a complementary shape of an engagement element of a shifting sleeve.

Element 15: further comprising misaligning the shifting key with a complementary shape of the engagement elements, and retracting the lower detent housing the upper detent housing against a force of a detent spring, wherein the detent spring is biased to urge the lower detent housing away from the upper detent housing. Element 16: further comprising, if the shifting key is aligned with the complementary shape, allowing the lower detent housing to advance away from the upper detent housing. Element 17: wherein the lower detent housing is urged away from the upper detent housing by a detent spring between the lower detent housing and the upper detent housing.

By way of non-limiting example, exemplary combinations applicable to A, B, and C include: Element 2 with Element 3; Element 2 with Element 4; Element 2 with Element 5; Element 2 with Element 6; Element 2 with Element 7; Element 9 with Element 10; Element 9 with Element 11; Element 9 with Element 12; Element 9 with Element 13; and Element 9 with Element 14.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A shifting tool, comprising:
   at least one shifting key;
   a lower detent housing operatively connected to the at least one shifting key such that advancement of the lower detent housing along a shifting rod advances the at least one shifting key radially away from the shifting rod;
   an upper detent housing slidingly coupled to the lower detent housing by at least one detent arm fixed to the upper detent housing and axially moveable through the lower detent housing between an advanced position and a retracted position, and wherein the at least one detent arm comprises an upper portion fixed to the upper detent housing, a narrow portion extending through the lower detent housing, and an end portion, wherein the upper detent housing is connected to the at least one shifting key via the lower detent housing;
   a detent spring biased to urge the lower detent housing away from the upper detent housing; and
   a return spring biased to urge the upper detent housing along the shifting rod in a direction that allows retraction of the at least one shifting key toward the shifting rod.

2. The shifting tool of claim 1, further comprising:
   a motor configured to advance and retract the upper detent housing along the shifting rod;
   a torque-limiting clutch; and
   a ball screw configured to translate rotary motion of the motor to axial motion of the upper detent housing.

3. The shifting tool of claim 1, wherein the detent spring is biased to urge the detent arm to the retracted position.

4. The shifting tool of claim 1, wherein a cross-sectional dimension of the narrow portion is smaller than a cross-sectional dimension of the upper portion and/or a cross-sectional dimension of the end portion.

5. The shifting tool of claim 1, wherein the lower detent housing transitions from the retracted position to the advanced position when a profile of the at least one shifting key is aligned with an engagement element of a shifting sleeve.

6. The shifting tool of claim 1, wherein the lower detent housing is urged to the retracted position against a force of the detent spring when a profile of the at least one shifting key is misaligned with an engagement element of a shifting sleeve.

7. The shifting tool of claim 1, wherein the at least one shifting key comprises a profile that is complementary with respect to an engagement element of a shifting sleeve.

8. A well system, comprising:
   a casing string extending from a surface location within a wellbore;
   a shifting sleeve within the casing string; and
   a shifting tool, comprising:
   at least one shifting key configured to engage the shifting sleeve;
   a lower detent housing connected to the at least one shifting key such that advancement of the lower detent housing along a shifting rod advances the at least one shifting key radially away from the shifting rod;
   an upper detent housing slidingly coupled to the lower detent housing by at least one detent arm fixed to the upper detent housing and axially moveable through the lower detent housing between an advanced position and a retracted position, and wherein the at least one detent arm comprises an upper portion fixed to the upper detent housing, a narrow portion extending through the lower detent housing, and an end portion, wherein the upper detent housing is connected to the at least one shifting key via the lower detent housing;

a detent spring biased to urge the lower detent housing away from the upper detent housing; and a return spring biased to urge the upper detent housing along the shifting rod in a direction that allows retraction of the at least one shifting key toward the shifting rod.

9. The well system shifting tool of claim 8, wherein the detent spring is biased to urge the detent arm to the retracted position.

10. The well system shifting tool of claim 8, wherein a cross-sectional dimension of the narrow portion is smaller than a cross-sectional dimension of the upper portion and/or a cross-sectional dimension of the end portion.

11. The well system shifting tool of claim 8, wherein the lower detent housing transitions from the retracted position to the advanced position when the at least one shifting key is aligned with an engagement element of a shifting sleeve.

12. The well system shifting tool of claim 8, wherein the lower detent housing is urged to the retracted position against a force of the detent spring when the at least one shifting key is not aligned an engagement element of a shifting sleeve.

13. A method, comprising:

positioning a shifting key of a shifting tool in a vicinity of an engagement element of a shifting sleeve within a casing string;

axially advancing an upper detent housing and a lower detent housing of the shifting tool with an advancing force and radially advancing at least a portion of the shifting key against the engagement element, wherein the upper detent housing is connected to the at least one shifting key via the lower detent housing, wherein the upper detent housing is slidingly coupled to the lower detent housing by at least one detent arm fixed to the upper detent housing and axially moveable through the lower detent housing, wherein the lower detent housing is urged away from the upper detent housing by a detent spring between the lower detent housing and the upper detent housing;

axially moving the shifting sleeve within the casing string via an axial load from the shifting tool; and if the advancing force is removed, axially retracting the upper detent housing and the lower detent housing with a return spring and radially retracting the shifting key.

14. The method of claim 13, further comprising:

misaligning the shifting key with respect to the engagement elements; and retracting the lower detent housing toward the upper detent housing against a force of the detent spring.

15. The method of claim 13, further comprising, when the shifting key is aligned with the engagement elements, allowing the lower detent housing to advance away from the upper detent housing.

* * * * *